(12) United States Patent
Huang et al.

(10) Patent No.: US 8,959,180 B1
(45) Date of Patent: *Feb. 17, 2015

(54) PROXY FOR TOLERATING FAULTS IN HIGH-SECURITY SYSTEMS

(71) Applicant: Google Inc., Mountain View, CA (US)

(72) Inventors: Andrew Chang Huang, Menlo Park, CA (US); Wendy Tobagus, Mountain View, CA (US); Arturo Crespo, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,170

(22) Filed: Dec. 9, 2013

Related U.S. Application Data

(63) Continuation of application No. 11/625,794, filed on Jan. 22, 2007, now Pat. No. 8,615,562.

(60) Provisional application No. 60/882,874, filed on Dec. 29, 2006.

(51) Int. Cl.
*H04L 29/06* (2006.01)
*G06F 15/16* (2006.01)

(52) U.S. Cl.
CPC ..................................... *H04L 63/20* (2013.01)
USPC ........... 709/217; 709/227; 709/230; 713/153; 713/155; 726/2; 726/12

(58) Field of Classification Search
USPC ......................................................... 709/217
See application file for complete search history.

(56) References Cited

U.S. PATENT DOCUMENTS

| | | | |
|---|---|---|---|
| 5,634,069 | A | 5/1997 | Hicok |
| 6,044,398 | A | 3/2000 | Marullo |
| 6,076,115 | A | 6/2000 | Sambamurthy |
| 6,684,257 | B1 | 1/2004 | Camut |
| 7,437,464 | B1 | 10/2008 | Xu |
| 7,467,399 | B2 | 12/2008 | Nadalin |
| 7,506,368 | B1 | 3/2009 | Kersey |
| 7,735,117 | B2 | 6/2010 | Nadalin |
| 2002/0023145 | A1 | 2/2002 | Orr |
| 2002/0049845 | A1 | 4/2002 | Sreenivasan |
| 2002/0066051 | A1 | 5/2002 | Hobson |
| 2002/0129239 | A1 | 9/2002 | Clark |
| 2002/0147771 | A1* | 10/2002 | Traversat et al. ............. 709/203 |
| 2002/0162024 | A1 | 10/2002 | Cunchon |
| 2003/0055976 | A1 | 3/2003 | Hartmann |
| 2003/0208690 | A1 | 11/2003 | Aull |
| 2004/0064568 | A1 | 4/2004 | Arora |
| 2004/0088347 | A1* | 5/2004 | Yeager et al. ................. 709/202 |
| 2004/0088369 | A1* | 5/2004 | Yeager et al. ................. 709/217 |
| 2006/0123474 | A1 | 6/2006 | Hagg |
| 2006/0259579 | A1* | 11/2006 | Beverly ........................ 709/217 |
| 2007/0124471 | A1 | 5/2007 | Harada |
| 2007/0157022 | A1 | 7/2007 | Blom |

(Continued)

*Primary Examiner* — Ian N Moore
*Assistant Examiner* — Jenee Williams
(74) *Attorney, Agent, or Firm* — Fish & Richardson P.C.

(57) ABSTRACT

One or more requests are received from a first system. The requests are queued in a queue. A serialization group is determined for a request and the request is associated with the determined serialization group. At least a subset of the requests from the queue is transmitted to a second system if the second system is available, including transmitting requests in a respective serialization group to the second system serially in accordance with an ordering of the requests within the respective serialization group.

22 Claims, 5 Drawing Sheets

(56) References Cited

U.S. PATENT DOCUMENTS

| | | |
|---|---|---|
| 2007/0299965 A1 | 12/2007 | Nieh |
| 2011/0202758 A1* | 8/2011 | Holden et al. ................ 713/155 |
| 2012/0150952 A1* | 6/2012 | Beverly ........................ 709/203 |
| 2012/0216272 A1 | 8/2012 | Hunyady |

* cited by examiner

PROXY FOR TOLERATING FAULTS IN HIGH-SECURITY SYSTEMS

RELATED APPLICATIONS

This application claims the benefit of U.S. patent application Ser. No. 11/625,794, titled "Proxy for Tolerating Faults in High-Security Systems", filed Jan. 22, 2007, which claims the benefit of U.S. Provisional Application No. 60/882,874, titled "Queueing and Caching Proxy for Tolerating Faults in High-Security Systems," filed Dec. 29, 2006, the disclosures of which are incorporated by reference here in their entirety.

BACKGROUND

This specification relates to fault-tolerant computing.

The functionality or availability of a computer system may be dependent on the availability of another computer system. For example, the functionality of an online shopping website may depend on the availability of a billing system. Ideally, the billing system is continuously available, so that the experience of a user with the shopping website is not adversely affected by downtime in the billing system.

In practice, the billing system may not be continuously available. The billing system may be taken down for maintenance from time to time or may be down due to system failure. The availability of the billing system imposes a ceiling of sorts on the availability of the shopping web site. To maintain the availability of the shopping web site, measures to increase the availability of the billing system may be implemented. However, the implementation of such measures may be complicated if the billing system handles sensitive information, such as financial data. Making changes to the billing system may lead to erosion of the security safeguards in the billing system and risk exposing sensitive data. Additionally, the shopping website and the billing system may be managed separately for security reasons. Coordinating maintenance downtimes for these separately managed systems can be difficult.

SUMMARY

In one aspect, systems and techniques disclosed here include receiving from a first system one or more requests, queuing the requests in a request queue, determining a serialization group for a request and associating the request with the determined serialization group, and transmitting at least a subset of the requests from the request queue to a second system if the second system is available. Queueing the requests includes determining a serialization group for a request and associating the request with the determined serialization group. Transmitting at least a subset of the requests includes transmitting requests in a respective serialization group to the second system serially in accordance with an ordering of the requests within the respective serialization group.

The aspects mentioned above may be implemented using a system, a method, a computer readable medium, or any combination of systems, methods, and computer readable media.

BRIEF DESCRIPTION OF THE DRAWINGS

Like reference numbers and designations in the various drawings indicate like elements.

DETAILED DESCRIPTION

Figure 1:
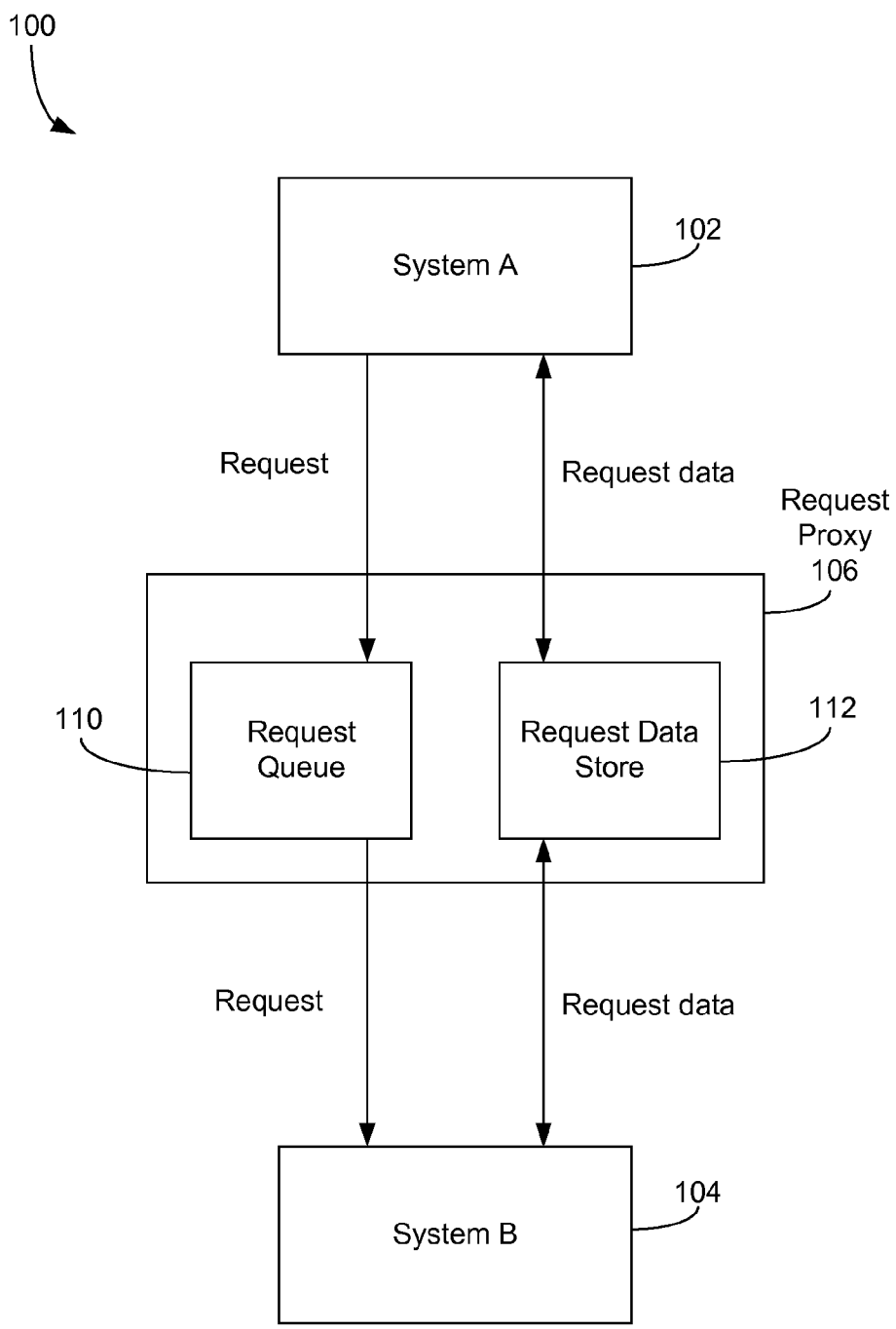
FIG. 1 is an entity relationship diagram of an example transaction system.

FIG. 1 is an entity relationship diagram of an example transaction system. The transaction system 100 includes a first computer system 102, a second computer system 104, and a request proxy 106 in data communication with both the first computer system 102 and the second computer system 104. For convenience, the first system 102 and the second system 104 will be referred to as "System A" and "System B," respectively. System A 102 and System B 104 can be respectively implemented in one or more computer systems, such as a number of server computers in a server farm. It should be appreciated that the system architecture illustrated in FIG. 1 is merely exemplary. Other system architectures can be used. Furthermore, it should be appreciated that while System A and System B are described above as computer systems, neither system is limited to systems that perform computing operations. Either system may be a system that merely makes requests to the other system, for example.

System A 102 may issue requests for processing by System B 104. The requests may be issued based on initiation by users or entities at System A. System B 104 processes the requests issued by System A 102. System B 104 may generate an output for a processed request based on the result of the processing. If System B 104 is unavailable, requests from System A 102 may go unprocessed. The functionality or availability of System A 102 may be dependent on the availability of System B 104. A request may be a request for System B to perform a transaction, operation, instruction, or any combination of transactions, operations, or instructions. For example, a request to add a credit card may be a request for System B to perform one or more operations to insert credit card information into a database. As another example, a request for data may be a request that data be transmitted to a specified system.

The data processed by and/or stored at System B 104 may be subject to heightened security requirements. For example, System B 104 may be responsible for processing private, sensitive financial data. System B 104 may have any number of data security measures and/or protocols implemented to protect the sensitive data.

In an exemplary implementation, System A 102 is a front end of an online shopping website and System B 104 is a billing system that processes requests from System A 102. Users of the online shopping website may initiate transactions (e.g., adding or deleting credit card information; making, modifying, or canceling orders to purchase goods or services; etc.). Requests for such transactions may be transmitted to System B 104 for processing. For purposes of illustration, reference may be made to this shopping website example throughout this specification.

Requests intended for System B 104 may be sent first to a request proxy 106. The request proxy 106 queues requests received from System A 102 and transmits requests to System B 104 when System B 104 is available. Requests may be held in the request proxy 106 while System B 104 is unavailable (e.g., system failure, system maintenance downtime, etc.). When a request is received by the request proxy 106, an emulative output corresponding to the request may be sent from the request proxy 106 to System A 102 for presentation to users, regardless of whether System B 104 is actually available at that time. The emulative outputs provide a response to the corresponding requests that are similar to a response had it been processed by System B 104, even if the actual request may still reside in the request queue awaiting transmission to System B 104 for processing. For example, if the transaction requested was an addition of a credit card, an emulative output indicating that the credit card was added may be transmitted to System A 102 for presentation to the pertinent user, even if the request has yet to be processed by System B 104. This kind of output from the request proxy 106 gives the user the impression that that the request was processed, as if System B 104 was available at that time. The actual request may still be pending in the request proxy 106 pending the availability of System B 104.

The request proxy 106 may include a request queue 110 and a request data store 112. The requests may be queued in the request queue 110. Request data associated with the requests may be written into the request data store 112. In some implementations, the request data store 112 is a write-through cache; data corresponding to a request is written into the data store 112 and, when the request is processed by System B 104, written into a data storage at System B 104, such as a database. In some implementations, the data written into the request data store 112 is a subset of the data that will be written into the data storage at System B 104. For example, if the request includes sensitive data, the data written into the request data store 112 may include only the subset of the data that is non-sensitive or subject to less stringent security requirements, such as the last 4 digits of a credit card number.

In one implementation, the emulative output that is transmitted to System A 102 may be generated from the data stored in the request data store 112. For example, if a user had added a credit card, data related to this transaction (e.g., last four digits of the credit card number, expiration date, cardholder name, billing address) may be written into request data store 112. Later, if the user placed an order using the added credit card, the emulative output for the order placement may include information associated with the added credit card, such as the last four digits of the added credit card and the expiration date. The information associated with the added credit card may be retrieved from the request data store 112.

Figure 2:
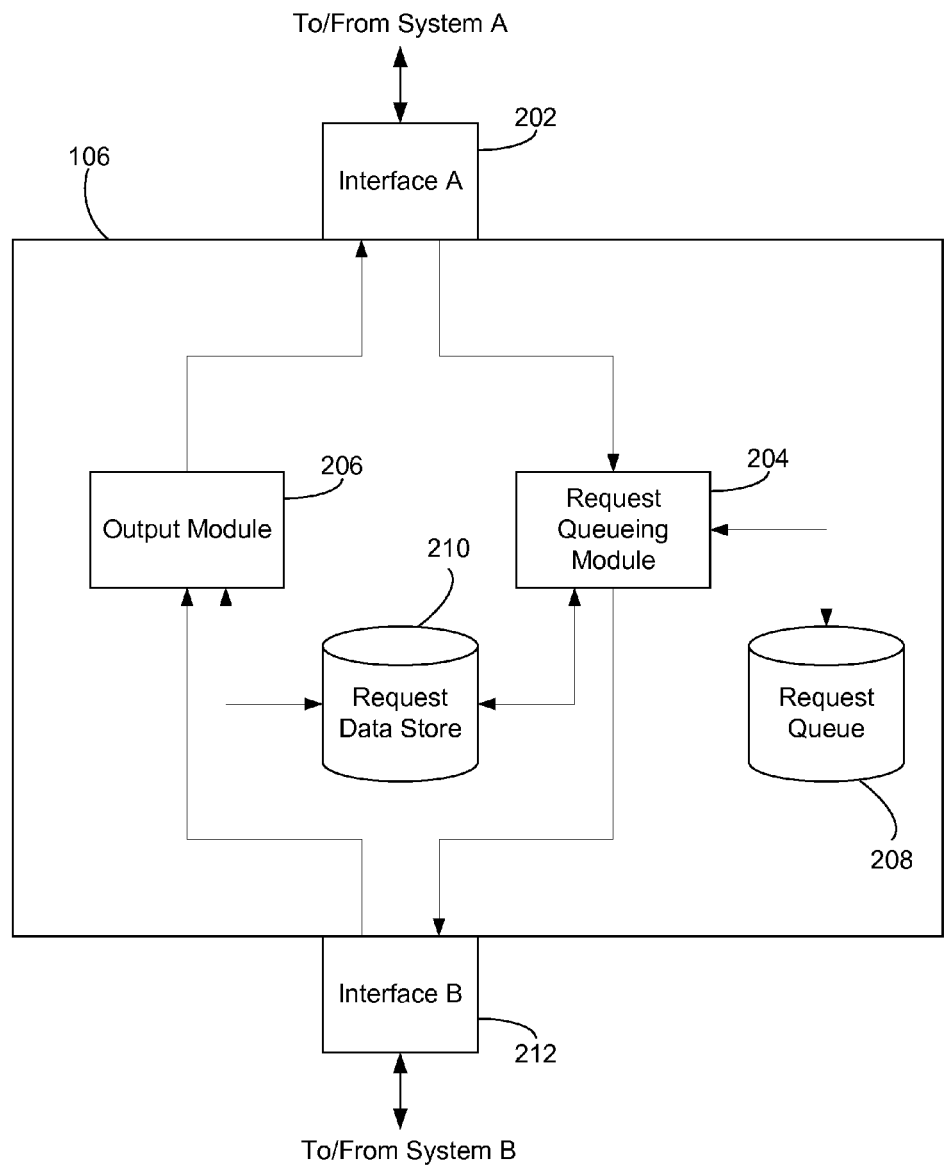
FIG. 2 is a block diagram of an example request proxy.

FIG. 2 is a block diagram of an example request proxy. The request proxy 106 can be implemented in one or more computer systems (e.g., a number of server computers in a server farm). The request proxy 106 may be in data communication with System A 102 and System B 104 through one or more networks (not shown), such as local area networks, wide area networks, the Internet, and so forth.

The request proxy 106 may be in data communication with System A 102 through a first interface 202 (hereinafter "Interface A"), and in data communication with System B 104 through a second interface 212 (hereinafter "Interface B). In some implementations, Interface A 202 and Interface B 212 include respective application programming interfaces (APIs). In some implementations, Interface A 202 includes the same API that System B 104 provides to other systems for data communication with System B 104 and which is included in Interface B 212. That is, the request proxy 106 exposes to System A 102 the same API that System B 104 exposes to other systems. The request proxy 106 is transparent from the perspective of System A 102; System A 102 behaves as if it is in data communication with System B 104 and sending requests directly to System B 104, even though it is the request proxy 106 that receives the requests from System A 102 request proxy In some other implementations, Interface A 202 and Interface B 212 are not the same. Interface A 202 may be implemented to receive requests from System A as described above. Some of the received requests may be batched together within the request proxy as one logical request. For example, various requests that are part of an overall transaction may be grouped together into a logical request. When the logical request is ready for sending System B, Interface B 212 divides the logical request back into the constituent requests and sends the constituent requests to System B.

A request queue 208 may be managed by a request queueing module 204. Requests may be enqueued into a request queue 208 by the request queueing module 204. Data corresponding to the requests may be written into a request data store 210, such as a database or a cache. Whenever System B 104 is available, the request queueing module 204 dequeues requests from the request queue 208 and transmits them to System B 104 through Interface B 212.

In some implementations, the request queueing module 204 logically groups requests within the request queue 208 into serialization groups and maintains orderings within each group with respect to the transmission of requests to System B 104. In some implementations, the request queueing module 204 may also manage the request data store 210. For example, the request queueing module 204 may enforce a replacement policy on the data in the request data store 210 based on the requests that are enqueued and dequeued from the request queue 208. In one implementation, the request queue is implemented as a database of requests.

Emulative outputs for requests may be generated by an output module 206. The emulative outputs generated by the output module 206 provide a response to the corresponding requests that are similar to a response had it been processed by System B 104, even if the actual request may still reside in the request queue 208 awaiting transmission to System B 104 for processing. The output module may retrieve data from the request data store 210 to generate the emulative outputs. When a request is actually processed by System B 104, the resulting or actual output may be received by the output module 206, which then may decide what to do with the resulting output. If the resulting output is the same as the emulative output that was generated earlier, the output module 206 may ignore the resulting input and not forward it. In some implementations, if the resulting output is different from the emulative output, the output module 206 may take further action, such as sending a message to the corresponding user. For example, a requested transaction may be a purchase order placed on a credit card, and the emulative output may be a confirmation that the order has been placed successfully. However if the actual output is an output indicating a failure to place the order due to failure to authorize the credit card (if the credit card is subject to a fraud alert, for example), a message may be sent to the user who placed the order indicating that the order was not placed and/or the actual output may be forwarded to the user. The message and/or the actual output may be sent directly to the user or to System A for forwarding or presentation to the user.

In some implementations, the request proxy 106 may handle requests from System A that are bound for different systems. For example, the request proxy 106 may handle requests from System A bound for System B and requests from System A bound for a third system (hereinafter "System C"). The request proxy 106 may include an interface, a request queue, and a request data store for each of these destination systems.

It should be appreciated that the descriptions of the modules and data stores in the request proxy above are merely exemplary. The modules described above may include submodules for performing particular operations described above, and the request proxy may include additional modules or data stores not described above. Further, the data storage elements described above (the request queue 208 and the request data store 210) may be implemented in a variety of data structures. For example, the request data store 210 may be implemented as a cache or as a database.

It should also be appreciated that while the description above describes an implementation having separate data storage elements (for example, multiple request queues 208 and multiple request data store 210), implementations having a shared request queue and a shared request data store are possible.

Figure 3:
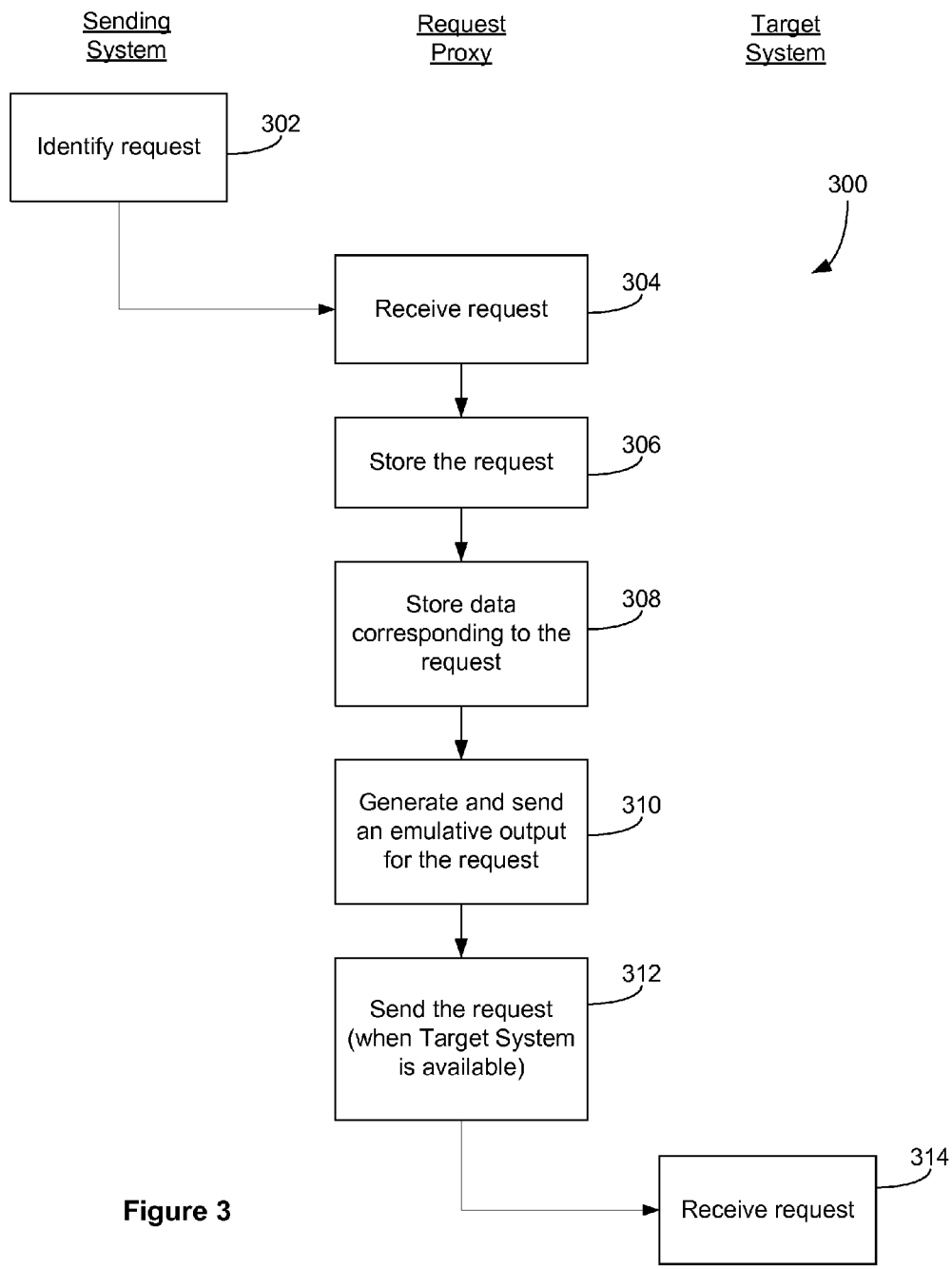
FIG. 3 is a flow diagram of an example process for transmitting requests.

FIG. 3 is a flow diagram of an example process for transmitting requests. In process flow 300, a request is identified (e.g., a request is identified by a sending system (e.g., System A)) request proxy (302). The request is received (e.g., by a request proxy) (304). The received request is stored in a first data structure (e.g., queued in a request queue in the request proxy) (306). Data corresponding to the request is stored in a second data structure (e.g., data is written into a request data store in the request proxy) (308). An emulative output for the requested transaction is generated and sent to a requesting device or system (e.g., System A or a client device in communication with System A) (310). In some implementations, the emulative output is presented by the requesting device or system to the user who initiated the request.

When a target system of the request is available and the request is available for processing (e.g., in a position in the request queue where it may be dequeued), the request is retrieved and forwarded to the target system (e.g., the request is dequeued from the request queue and sent to System B) (312). Thereafter, the target system receives and processes the request (e.g., System B receives the request (314) and processes the request).

Process flow 300 may be illustrated using the shopping website example. After the user initiates a transaction to add a credit card, the shopping website front end (System A) transmits the request to add the credit card, which is intended for a billing system (System B). The request is received by a request proxy. At the request proxy, the request to add the credit card is added to the request queue. Data corresponding to the credit card addition request is written to the request data store. The data that is written into the request data store may include, for example, the last four digits of the credit card number, the expiration date of the credit card, the type of credit card (e.g., VISA, MASTERCARD, etc.), the name of the cardholder, and so forth.

An emulative output is sent from the request proxy to the shopping website front end, for presentation to the user. The emulative output indicates the result of the request as if the request has been processed by the billing system.

In some implementations, the emulative output may be generated by the request proxy based on the data retrieved from the request data store. For example, if the added credit card was used to place an order, the emulative output corresponding to the placement of the order, which may show information corresponding to the added credit card, may be generated by the request proxy based on the information corresponding to the added credit card. The information corresponding to the added credit card may be retrieved from the request data store, in which the credit card information may have been stored due to a preceding credit card addition transaction.

The actual request to add the credit card is dequeued from the request queue and sent to the billing system when the billing system is available and the request is in a position in the request queue to be dequeued. The billing system receives the request to add the credit card and processes the request.

Whenever System B becomes unavailable, the request proxy may stop dequeueing requests and sending requests to System B. The request proxy may retry sending requests to System B in accordance with a backoff strategy. In some implementations, the request proxy may retry sending requests to System B in accordance with an exponential backoff strategy or algorithm. For example, if System B becomes unavailable, the request proxy may retry transmissions of requests after backoff intervals of 1 second, 2 seconds, 4 seconds, 8 seconds, 16 seconds, and so forth. In one implementation, there may be a predefined ceiling on the backoff interval, so that the backoff interval does not become excessively long. In some other implementations, other retry strategies (e.g., retry after a backoff interval, where the backoff interval is always the same) may be used.

For some systems, the order in which requests are processed is significant. Returning to the shopping website example, an order placed by a user on a credit card should not be processed before a request from the same user to add that credit card. If the order request was processed before the credit card was added, an error for an unrecognized form of payment may occur. The request proxy may manage the order in which requests are dequeued and sent to System B to ensure proper ordering of the requests. An example of such is described below.

Figure 4:
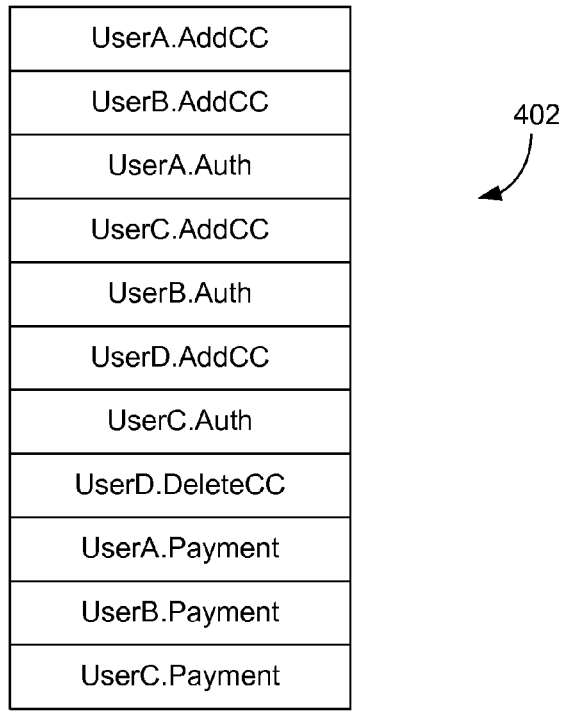
FIG. 4 is a conceptual diagram illustrating an example request queue and example serialization groups.
Figure 4:
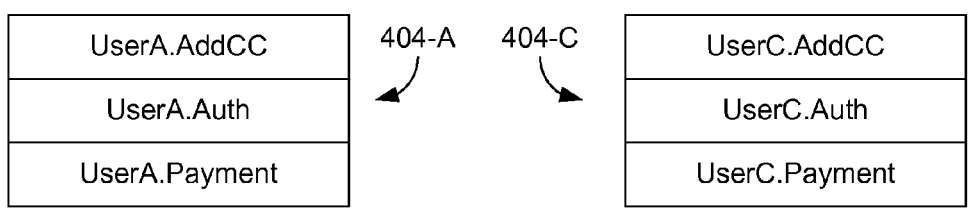
Figure 4:
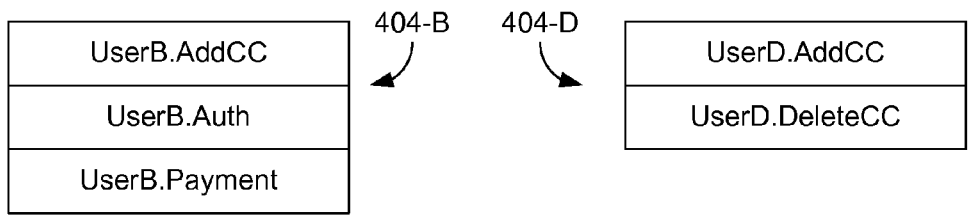

FIG. 4 is a conceptual diagram illustrating an example request queue and example serialization groups. The request queue 402 includes requests from System A. The requests may be initiated by any number of users or entities. The requests initiated by a particular user or entity need not be consecutive within the request queue 402; the requests initiated by a user or entity may be spread out throughout the queue 402.

In some implementations, the default enqueueing order of requests in the request queue 402 is based on the order in which the requests were received by the request proxy. In some implementations, the default dequeueing order of requests from the request queue 402 are also based on the order in which the requests were received by the request proxy; a request that is received earlier than another is dequeued earlier than the other. In some other implementations, the default ordering for enqueueing and dequeueing is based on the timestamps associated with the requests, the timestamps being the times the requests were initiated at the initiating system (e.g., System A).

The requests in the request queue 402 may be grouped into one or more serialization groups. Within a serialization group, the requests in the group are transmitted to System B serially and processed serially, in a particular order. This ensures that the ordering of requests within any particular serialization group is preserved even if the requests are out of order within the request queue 402. In some implementations, the transaction queuing module may hold back certain requests from being sent ahead of other requests to enforce the orderings within the serialization groups. The request queueing module may also hold back requests within a serialization group from being sent if a preceding request within the serialization group has failed or was not processed successfully.

In some implementations, the request queue includes requests that are grouped into (and associated with) serialization groups and requests that are not grouped into or associated with any serialization group. The requests that are not associated with a serialization group may include those requests for which the order of sending or processing is not significant. In an exemplary implementation, the order in which the requests are sent may be first in first out, based on the ordering of the requests in the request queue, along with any ordering requirements due to the serialization groups. The requests not associated with a serialization group are sent based on their positions in the request queue. In another implementation, the requests not associated with a serialization group may be sent in any order, whether it is arbitrary, random, or first in first out based on their positions in the queue, while the requests that are associated with serialization groups are sent based on their positions in the request queue and their positions within the serialization groups. If a request not associated with a serialization group fails, that request may be held in the request queue and sending of the request may be retried without holding back other requests. The request may be marked in the queue as "retrying" to indicate that the request was a failed request for which sending is retried.

In some implementations, requests from different serialization groups may be stored in the same request queue. In some other implementations, each serialization group has its own request queue.

In one implementation, the order within a serialization group is the order in which the requests within the serialization group are received by the request proxy. In another implementation, the order within a serialization group is based on the timestamps of the requests, the timestamps being the respective times when the requests were initiated at the initiating system (e.g., System A).

In one implementation, the requests are grouped into serialization groups based on an originator or initiator of the request. As an illustration, in the shopping website example, requests may include an identifier of the customer or user who initiated the transaction, which may be located in the data for the respective requests. The requests may be grouped into serialization groups based on the customer or user identifier. As illustrated in FIG. 4, the initiating users of the requests in the request queue 402 are indicated as UserA, UserB, UserC, and UserD. Based on these users, the request queues may be grouped into serialization groups 404-A, 404-B, 404-C, and 404-D.

In another implementation, the serialization groupings may be formed based on additional parameters. For example, the requests for the shopping website example above may be grouped based on the user identifier and an identifier of the corresponding order.

In one implementation, the serialization groupings may be stored as ordered lists in the request proxy. For example, ordered lists of request identifiers may be stored in a storage medium in the request proxy.

Figure 5:
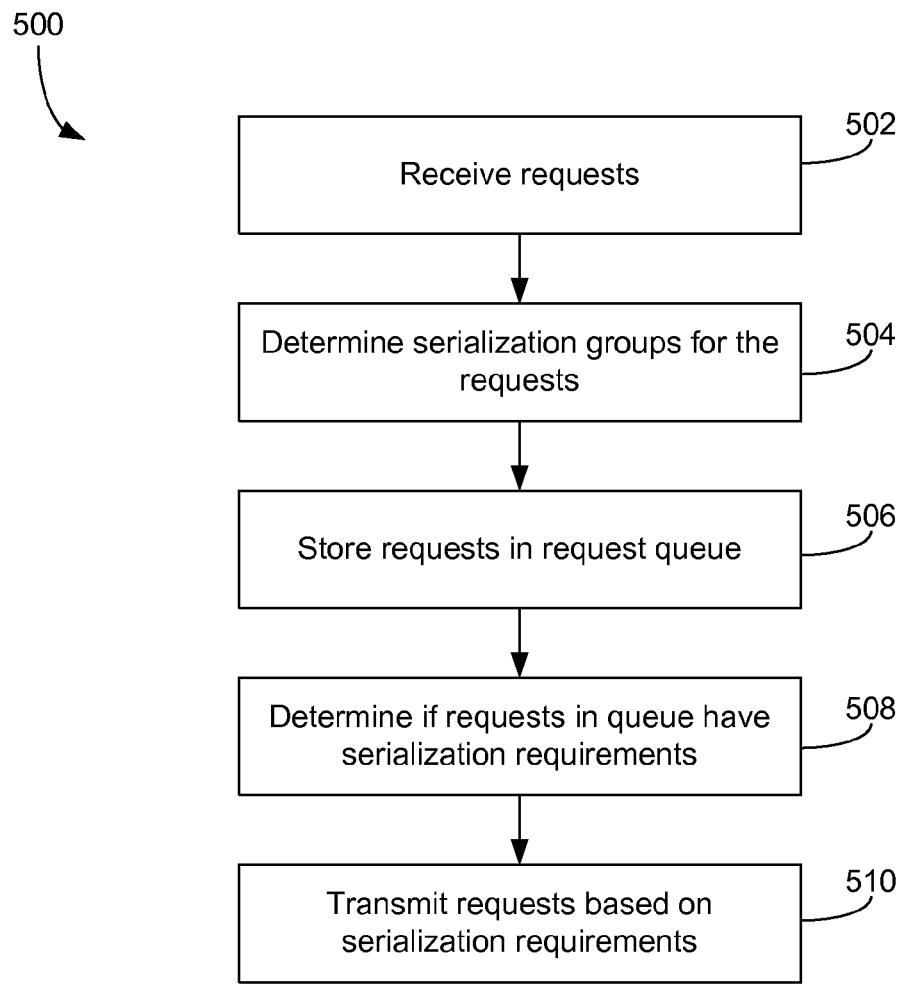
FIG. 5 is a flow diagram of an example process for transmitting requests based on serialization groups.

Referring to FIG. 5, in process flow 500, one or more requests are received (e.g., by the request proxy) (502). One or more serialization groups (e.g., serialization groups 404-A thru 404-D for the requests in request queue 402 (FIG. 4)) for the requests are determined (504). In some implementations, the serialization groups may be determined based on the initiator (e.g., identity of the initiating user, client device, or system) of the request.

The requests are stored in a data structure (e.g., a request queue in the request proxy) (506). For requests that are stored in the queue, whether the requests are subject to serialization requirements is determined (508). Examples of serialization requirements include the orderings of requests within serialization groups. The requests are transmitted to a target system (e.g., System B) based on any determined serialization requirements (510). For example, if the request queue includes multiple requests that are ordered in a particular order within a serialization group, these multiple requests are sent to the target system in that particular order (but not necessarily consecutively).

In some implementations, the request proxy may also be used for the scheduling of requests for delayed transmission and/or processing. A request may be delayed from being sent until a timing condition is satisfied. For example, a website may include time-limited user accounts, where user accounts expire after a certain time, such as 30 days. When a user creates a time-limited account, the system may make an account expiration request, with the timing condition being 30 days from the time of the request, as part of the process. The account expiration request may specify a time when the requests should be sent or processed. The request proxy may enqueue the account expiration request and schedule the request for transmission at the time the account is set to expire. During the period before the account expiration time, the request proxy may delay processing of the expiration request by holding the request in the queue and dequeueing other requests ahead of the expiration request, or dequeueing and enqueueing the expiration request to put the expiration request in the "back" of the request queue. When the timing condition is satisfied (the 30 days has passed), the expiration request may be sent from the request queue.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A method, comprising:
   receiving, by a request proxy system being subject to a first security requirement, a first request including request data, the first request requesting that an action that uses the request data as a parameter be authorized at a request processing system being subject to a second security requirement that is more stringent than the first security requirement;
   transmitting, from the request proxy system, the first request to the request processing system; and
   before the request proxy system receives a response to the first request from the request processing system:
     receiving, by the request proxy system, a second request, the second request requesting performance of the action;
     generating, by the request proxy system, an emulated output from the request processing system, the emulated output indicating that the action using the request data as a parameter is authorized under the second security requirement; and
     providing, by the request proxy system, a response to the second request, including providing for presentation a result of the action performed under the first security requirement using the request data as a parameter.

2. The method of claim 1, further comprising queuing, at the request proxy system, the first request in a request queue, where queuing the first request in the request queue includes:
   determining a serialization group for the first request; and
   associating the first request with the serialization group.

3. The method of claim 2, where transmitting the first request to the request processing system includes transmitting requests in the serialization group to the request processing system serially in accordance with an ordering of the requests within the serialization group.

4. The method of claim 2, further comprising enforcing a replacement policy on the request data stored in a data store based on requests in the request queue.

5. The method of claim 2, further comprising:
   delaying transmitting of the first request in the request queue until a timing condition is satisfied; and if the timing condition is satisfied, transmitting the request in the request queue to the request processing system if the request processing system is available.

6. The method of claim 2, wherein a copy of at least a portion of the request data is stored separately from the request queue.

7. The method of claim 1, comprising:
receiving, by the request proxy system, the response from the request processing system;
determining that the response from the request processing system indicates unsuccessful authorization; and then
providing a message for display, the message indicating that the action did not complete.

8. The method of claim 1, wherein the request processing system is configured to process financial data designates as private and sensitive, and the second request comprises a request to place an order using at least a portion of the financial data.

9. The method of claim 1, wherein the first request is associated with a serialization group based on an initiator of the first request.

10. The method of claim 1, further comprising if the request processing system is not available, retrying the transmitting.

11. The method of claim 10, wherein retrying the transmitting comprises retrying the transmitting in accordance with an exponential backoff strategy.

12. The method of claim 1, wherein receiving the first request comprises receiving the first request from a content providing system in accordance with an interface between the content providing system and the request proxy system.

13. The method of claim 12, wherein the content providing system comprises a website, and the request processing system comprises a billing system.

14. The method of claim 1, wherein the first request is a logical request that includes various requests that are parts of an overall transaction.

15. A system, comprising:
one or more computers configured to perform operations comprising:
receiving, by a request proxy system being subject to a first security requirement, a first request including request data, the first request requesting that an action that uses the request data as a parameter be authorized at a request processing system being subject to a second security requirement that is more stringent than the first security requirement;
transmitting, from the request proxy system, the first request to the request processing system; and
before the request proxy system receives a response to the first request from the request processing system:
receiving, by the request proxy system, a second request, the second request requesting performance of the action;
generating, by the request proxy system, an emulated output from the request processing system, the emulated output indicating that the action using the request data as a parameter is authorized under the second security requirement; and
providing, by the request proxy system, a response to the second request, including providing for presentation a result of the action performed under the first security requirement using the request data as a parameter.

16. The system of claim 15, the operations further comprising queuing, at the request proxy system, the first request in a request queue, wherein queuing the first request in the request queue includes:
determining a serialization group for the first request; and
associating the first request with the serialization group.

17. A non-transitory computer-readable medium storing instructions which, when executed by one or more processors, causes the one or more processors to perform operations comprising:
receiving, by a request proxy system being subject to a first security requirement, a first request including request data, the first request requesting that an action that uses the request data as a parameter be authorized at a request processing system being subject to a second security requirement that is more stringent than the first security requirement;
transmitting, from the request proxy system, the first request to a request processing system; and
before the request proxy system receives a response to the first request from the request processing system:
receiving, by the request proxy system, a second request, the second request requesting performance of the action;
generating, by the request proxy system, an emulated output from the request processing system, the emulated output indicating that the action using the request data as a parameter is authorized under the second security requirement; and
providing, by the request proxy system, a response to the second request, including providing for presentation a result of the action performed under the first security requirement using the request data as a parameter.

18. The medium of claim 17, the operations comprising:
queuing the first request in a request queue, where queuing the first request in the request queue includes:
determining a serialization group for the first request; and
associating the first request with the serialization group.

19. The medium of claim 18, wherein a copy of at least a portion of the request data in a data store is stored separately from the request queue.

20. The medium of claim 17, wherein receiving the first request comprises receiving the first request from a content providing system in accordance with an interface between the content providing system and the request proxy system.

21. The medium of claim 20, wherein the content providing system comprises a website, and the request processing system comprises a billing system.

22. The medium of claim 20, the operations further comprising if the request processing system is not available, retrying the transmitting.

* * * * *